US009928756B2

United States Patent
Shovkoplias (10) Patent No.: US 9,928,756 B2
(45) Date of Patent: *Mar. 27, 2018

(54) HEARING AND SPEECH IMPAIRED ELECTRONIC DEVICE CONTROL

(71) Applicant: Echostar Ukraine L.L.C., Kharkiv (UA)

(72) Inventor: Yuri Shovkoplias, Kharkiv (UA)

(73) Assignee: Echostar Ukraine L.L.C., Kharkov (UA)

( * ) Notice: Subject to any disclaimer, the term of this patent is extended or adjusted under 35 U.S.C. 154(b) by 0 days.

This patent is subject to a terminal disclaimer.

(21) Appl. No.: 15/634,474

(22) Filed: Jun. 27, 2017

(65) Prior Publication Data

US 2017/0330484 A1 Nov. 16, 2017

Related U.S. Application Data

(63) Continuation of application No. 13/882,642, filed as application No. PCT/UA2010/000085 on Jun. 18, 2013, now Pat. No. 9,721,481.

(51) Int. Cl.
*G09B 21/00* (2006.01)
*H04N 21/422* (2011.01)
(Continued)

(52) U.S. Cl.
CPC ............ *G09B 21/00* (2013.01); *G06F 3/005* (2013.01); *G06F 3/017* (2013.01); *H04N 21/42222* (2013.01)

(58) Field of Classification Search
CPC ......... G06F 3/005; G06F 3/017; G09B 21/00; H04N 21/42222
(Continued)

(56) References Cited

U.S. PATENT DOCUMENTS 5,594,469 A 1/1997 Freeman et al.
5,699,441 A * 12/1997 Sagawa ............... G06F 17/2872
382/100
(Continued)

FOREIGN PATENT DOCUMENTS

WO 2012/064309 A1 5/2012

OTHER PUBLICATIONS

International Search Report and Written Opinion dated Aug. 11, 2011 for PCT/UA2010/000085, all pages.
(Continued)

*Primary Examiner* — Naomi Small
(74) *Attorney, Agent, or Firm* — Kilpatrick Townsend & Stockton LLP (57) ABSTRACT

A sign language message may be derived from user movements detected proximate to an electronic device by comparing the movements to a database that includes data regarding one or more sign languages. A control function may then be identified which the electronic device may be caused to perform. Output related to the user's detected movements may be provided to the user. In some implementations, output specifying identified control functions may be transmitted to a presentation device. Further, in some implementations, if a sign language message and/or a control function cannot be unambiguously derived and/or identified, output promoting the user to provide additional information may be transmitted to a presentation device. Detected movements may be compared to data regarding multiple different sign languages and/or a subset of available multiple different sign languages.

20 Claims, 7 Drawing Sheets

(51) Int. Cl.
*G06F 3/00* (2006.01)
*G06F 3/01* (2006.01)
(58) Field of Classification Search
USPC ........................................................ 340/4.11
See application file for complete search history.

(56) References Cited

U.S. PATENT DOCUMENTS

| | | | |
|---|---|---|---|
| 6,191,773 B1 | 2/2001 | Maruno et al. | |
| 6,950,534 B2* | 9/2005 | Cohen | G06F 3/017 382/103 |
| 9,721,481 B2 | 8/2017 | Shovkoplias | |
| 2004/0068409 A1* | 4/2004 | Tanaka | B25J 9/1656 704/272 |
| 2004/0193413 A1* | 9/2004 | Wilson | G06F 3/017 704/243 |
| 2005/0212755 A1* | 9/2005 | Marvit | G06F 1/1626 345/156 |
| 2009/0079813 A1 | 3/2009 | Hildreth | |
| 2009/0102800 A1 | 4/2009 | Keenan | |
| 2011/0148786 A1* | 6/2011 | Day | G06F 3/04883 345/173 |
| 2011/0157012 A1* | 6/2011 | Ma | G06F 3/017 345/157 |
| 2011/0197263 A1* | 8/2011 | Stinson, III | G06F 3/011 726/4 |
| 2011/0274311 A1* | 11/2011 | Lee | G06K 9/00 382/100 |
| 2011/0313768 A1* | 12/2011 | Klein | G06F 3/017 704/251 |
| 2012/0007713 A1* | 1/2012 | Nasiri | G06F 1/1694 340/5.81 |
| 2013/0159939 A1* | 6/2013 | Krishnamurthi | G06F 3/011 715/863 |

OTHER PUBLICATIONS

International Preliminary Report on Patentability dated May 14, 2013 for PCT/UA2010/000085, all pages.

* cited by examiner

HEARING AND SPEECH IMPAIRED ELECTRONIC DEVICE CONTROL

CROSS REFERENCE TO RELATED APPLICATIONS

The present application is a continuation of U.S. Nonprovisional patent application Ser. No. 13/882,642, which was filed on Jun. 18, 2013, and entitled "Hearing and Speech Impaired Electronic Device Control," which is a U.S. National Stage Application of PCT International Application No. PCT/UA2010/000085, which was filed on Nov. 11, 2010, and entitled "Hearing and/or Speech Impaired Electronic Device Control," which are both incorporated by reference in their entireties.

FIELD OF THE INVENTION

This disclosure relates generally to control of electronic devices, and more specifically to utilizing sign language to control electronic devices.

SUMMARY

The present disclosure discloses systems and methods for hearing and/or speech impaired control of electronic devices. A sign language message may be derived from movements of a user detected proximate to an electronic device utilizing a movement sensor by comparing the movements to a database that includes data regarding one or more sign languages. A control function of the electronic device may then be identified based on analysis of the sign language message and the electronic device may be caused to perform the control function. As such, the user is able to utilize sign language to control the electronic device.

Output related to the user's detected movements may be provided to the user. In some implementations, output specifying identified control functions may be transmitted to a presentation device. Further, in some implementations, if a sign language message cannot be unambiguously derived from the user's movements and/or a control function cannot be unambiguously identified from a sign language message, output promoting the user to provide additional information may be transmitted to a presentation device. The ambiguity may then be resolved based at least on the addition information provided by the user in response to the prompt.

Detected movements may be compared to data regarding multiple different sign languages. However, in various implementations detected movements may be compared to data regarding a particular sign language. In some of these various implementations, the detected movements may be compared to data regarding a particular sign language based on a setting, such as a user preference or a default setting. However, in other of these various implementations, the particular sign language of a sign language message may be determined by comparing a first set of movements to data regarding multiple different sign languages and deriving a first sign language message component. Then, once the particular sign language is identified, subsequent sets of movements may be compared to just data regarding the determined particular sign language to derive additional sign language message components.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Electronic devices (such as computers, telephones, microwave ovens and other kitchen appliances, televisions, lighting and climate systems, radios, and so on) abound in the modern world. As electronic devices become increasingly present in the lives of users, manufacturers may attempt to provide increasingly simplistic and convenient ways for users to control such electronic devices. Users may be able to control some electronic devices utilizing speech. In other words, the user may be able to speak commands to an electronic device and the electronic device may understood and perform the spoken commands. By way of a first example, a user may tell a set top box to switch to a desired channel. By way of a second example, a user may tell an oven to activate a broiler. Additionally, some devices may be capable of outputting speech messages, essentially "talking" to a user. For example, a microwave may play a speech message (such as a pre-recorded speech message, a synthesized speech message, and so on) requesting that a user turn over an item being defrosted.

However, speech impaired users may not be able to control electronic devices that are capable of being controlled by speech. Further, hearing impaired users may not be able to recognize speech output provided by an electronic device. As such, users with speech and/or hearing impairments may not be able to take advantage of the simpler and more convenient speech interfaces of various electronic devices. Instead, such users may be required to utilize less convenient physical interfaces, such as keyboards, buttons, touch screens, and so on.

Moreover, even users who do not have hearing and/or speech impairments may not always be able to talk to electronic devices or hear their electronic devices "talk" back. For example, when utilizing an electronic device in a high noise environment such as a rock concert or a quiet required environment such as a library, even users without hearing and/or speech impairments may be unable to use speech recognition and/or speech output functions of the electronic device. Thus, in such an environment, the user may be required to utilize less convenient physical interfaces, such as keyboards, buttons, touch screens, and so on, even though the user is not hearing and/or speech impaired.

The present disclosure discloses systems and methods for hearing and/or speech impaired control of electronic devices. Movements of a user located proximate to an electronic device may be detected. A sign language message may be derived from the detected movements by comparing the movements to a database of one or more sign languages. The sign language message may then be analyzed to identify a control function of the electronic device that is associated with the sign language message. Thus, a user may utilize sign language to control the electronic device.

Figure 1:
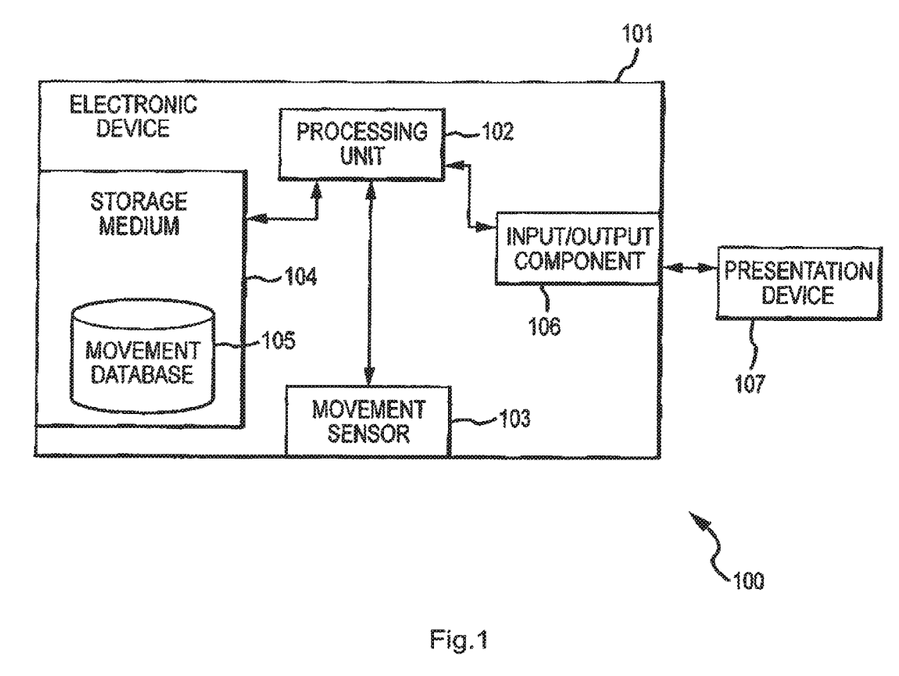
FIG. 1 is a block diagram illustrating a system for hearing and/or speech impaired control of an electronic device.

FIG. 1 is a block diagram illustrating a system 100 for hearing and/or speech impaired control of an electronic device. The system 100 includes a electronic device 101 which may be any kind of electronic device (such as a computer, a telephone, a microwave or other kitchen appliance, a television, a set top box, a lighting and/or climate system, a radio, a digital music player, a digital video recorder, a digital video disc player, and so on) and may perform a number of different control functions in response to user instruction.

The electronic device may include one or more processing units 102, one or more movement sensors 103, and one or more non-transitory storage media 104 (which may take the form of, but is not limited to, a magnetic storage medium; optical storage medium; magneto-optical storage medium; read only memory; random access memory; erasable programmable memory; flash memory; and so on). The storage medium may store a movement database 105 that includes movements that correspond to sign language message components one or more sign languages (such as American Sign Language, Russian Sign Language, Ukrainian Sign Language, Chinese Sign Language, British Sign Language, International Sign, and so on). The movement sensor may be any kind of sensor that is operable to detect movement including, but not limited to, a camera (such as a video camera or a still image camera), an infrared motion detector, an ultrasonic motion detector, a microwave sensor, and so on. Additionally, in some implementations the movement sensor may be incorporated into an apparatus (such as gloves or other items of clothing) that may be worn by a user and includes positioning sensors (such as global positioning sensors) for detecting movement of the wearer.

The processing unit 102 may execute instructions stored in the storage medium 104 to detect user movements utilizing the movement sensor 103, compare the detected movements to the movement database 105 to derive a sign language message from the detected movements, and identify a control function which the electronic device 101 is operable to perform that is associated with the sign language message. After the processing unit identifies the control function, the processing device may cause the electronic device to perform the control function, such as by executing instructions stored in the storage medium that are associated with the identified control function.

As sign languages may include multiple different ways of phrasing the same statement, the processing unit 102 may identify a single associated control function from multiple different sign language messages. For example, a set top box may identify a "switch channel to two-hundred twenty-two" control function from sign language messages that include sign language message components "two two two," "two hundred twenty two," two hundred and twenty two," and so on.

The system 100 may also include one or more presentation devices 107 (such as a display screen, a speaker, and so on) and the electronic device 101 may include one or more input/output components 106 for transmitting output to the presentation device. The processing unit 102 may transmit an output message to the presentation device via the input/output component after deriving a sign language message from the detected movement. The processing unit may transmit the output message to notify the user as to the sign language message that was derived from the detected movements, the control function that was identified as related to the derived sign language message, and so on. The output message may include a variety of presentation forms such as text to display, recorded speech, synthesized speech, images or video of sign language, combinations thereof, and so on.

The processing unit 102 may not always be able to unambiguously derive a sign language message from the detected movement, identify a control function associated with a derived sign language message, and so on. In some implementations, when the processing unit determines that it cannot unambiguously derive a sign language message from the detected movement, the processing unit may transmit an output message to the presentation device 107 via the input/output component 106 that requests the user to re-perform the sign language related to the attempted sign language message. For example, if the processing unit is not able to derive a sign language message from the detected movement because the detected movement does not correspond to any movements in the movement database 105, the processing unit may transmit an output message to the presentation device via the input/output component that indicates that the sign language was not understood and requests the user to re-perform.

Further, in some implementations, when the processing unit determines that it cannot unambiguously identify a control function associated with a derived sign language message, the processing unit 102 may transmit an output message to the presentation device 107 via the input/output component 106 that requests the user provide additional information to clarify the ambiguity. Then, after the processing unit receives the additional information from the user, the processing unit may identify the control function from a combination of the identified sign language message and the additional information. For example, the electronic device may be a microwave and the processing unit may derive a sign language message of "thirty seconds" from detected movement. The microwave may include control functions to cook for thirty seconds as well as defrost for thirty seconds and the processing unit may not be able to determine which control function is intended without additional information. As such, the processing unit may transmit an output message to the presentation device via the input/output component that prompts the user to select either the cook control function or the defrost control function.

Although the processing unit 102, movement sensor 103, storage medium 140, and input/output component 106 are shown and described above as being incorporated into the electronic device 101, in various implementations one or more of the processing unit, movement sensor, storage medium and/or input/output component may be separate from the electronic device and may communicate with the electronic device to perform the above described functions.

Further, although the above describes control of the electronic device 101 utilizing fully developed sign languages intended for communication, in various implementations the sign languages may include pantomime communication systems specifically developed for controlling the electronic device or similar electronic devices that consist of a few signs relating to control functions. For example, a set top box may include pre-defined functionality to recognize a system of pantomimes corresponding to channels to which to switch the set top box that consists of the user holding up a number of fingers to indicate channel numbers in sequence. By way of a second example, instead of including pre-defined functionality to recognize the system of pantomimes, a set top box may include the ability to record user pantomimes to associate with control functions which may then be detected and recognized.

Figure 2:
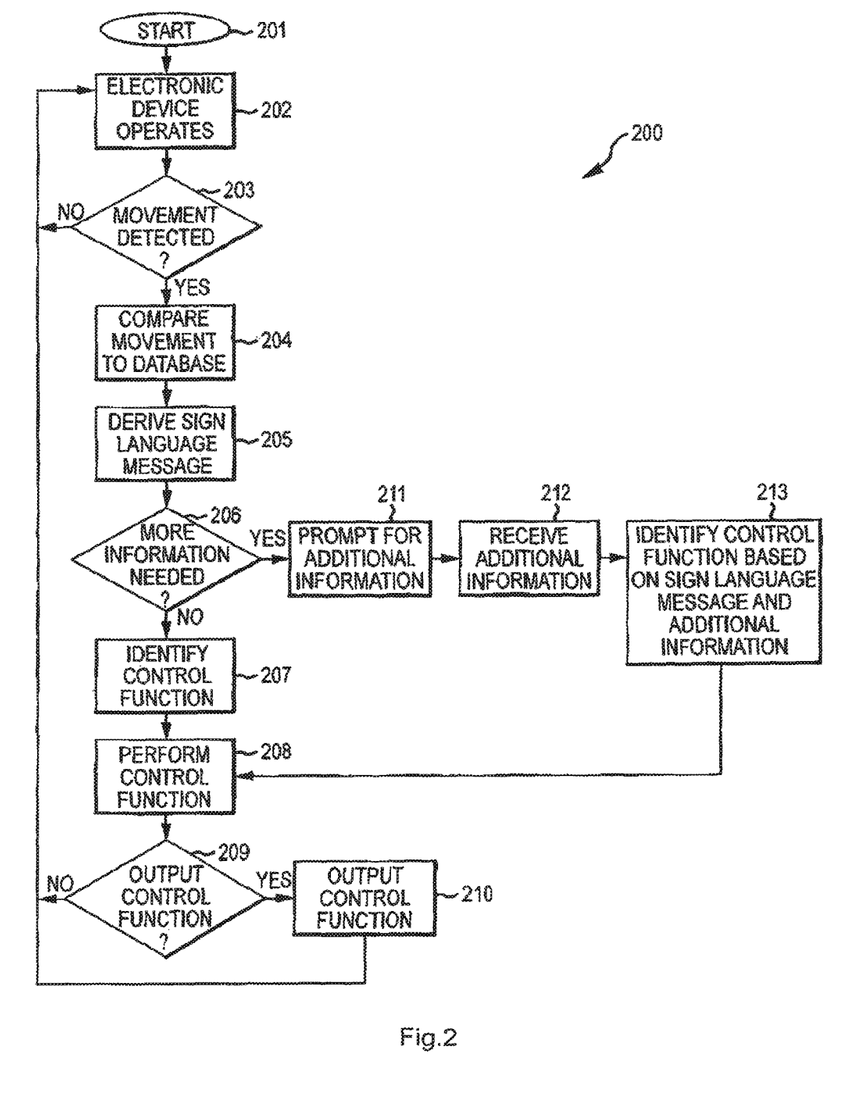
FIG. 2 is a flow chart illustrating a method for hearing and/or speech impaired control of an electronic device. This method may be performed by the system of FIG. 1.

FIG. 2 illustrates a method 200 for hearing and/or speech impaired control of an electronic device. The method 200 may be performed by the electronic device 101 of FIG. 1. The flow begins at block 201 and proceeds to block 202 where the electronic device begins operations. The flow then proceeds to block 203 where the processing unit 102 determines whether or not movement is detected by the movement sensor 103. If so, the flow proceeds to block 204. Otherwise, the flow returns to block 202 where the electronic device continues operating.

At block 204, the processing unit 102 compares the detected movement to the movement database 105. The flow then proceeds to block 205 where the processing unit derives a sign language message from the detected movement based on the comparison of the detected movement to the movement database. Next, the flow proceeds to block 206 where the processing unit determines whether or not additional information is needed to identify a control function associated with the sign language message. If so, the flow proceeds to block 211. Otherwise, the flow proceeds to block 207.

At block 207, after the processing unit 102 determines that additional information is not needed, the processing unit identifies the control function associated with the sign language message. The flow then proceeds to block 208 where the processing unit causes the electronic device 101 to perform the control function. Next, the flow proceeds to block 209 processing unit determines whether or not to output the identified control function. If so, the flow proceeds to block 210. Otherwise, the flow returns to block 202 where the electronic device continues operating. The processing unit may base the determination of whether or not to output the identified control function based on one or more settings, such as user preferences, stored in the storage medium 104.

At block 210, after the processing unit 102 determines to output the identified control function, the processing unit transmits an output message which specifies the identified control function to the presentation device 107 via the input/output component 106. The flow then returns to block 202 where the electronic device continues operating.

At block 211, after the processing unit 102 determines that additional information is needed to identify the control function associated with the sign language message, the processing unit prompts a user for additional information by transmitting an output message to the presentation device 107 via the input/output component 106. The flow then proceeds to block 212 where the processing unit receives the additional information from the user. Next, the flow proceeds to block 213 where the processing unit identifies the control function sign language message based on the sign language message and the additional information. The flow then proceeds to block 208 where the processing unit causes the electronic device 101 to perform the control function.

Returning to FIG. 1, in some implementations, when the processing unit 102 compares detected movements to the movement database 105, the processing unit may compare the detected movements to data regarding multiple different sign languages stored in the movement database.

However, in other implementations the processing unit 102 may compare the detected movements to data regarding a particular sign language stored in the movement database 105 instead of all of the different sign languages stored in the movement database. In this way, less time and/or resources may be required for the comparison. For example, the movement database may include data regarding movements of American Sign Language, Russian Sign Language, and Ukrainian Sign Language. However, the processing unit may compare detected movements to just data regarding movements of American Sign Language. The processing unit may compare detected movements to data regarding a particular sign language based on a setting, such as a user preference or a default setting, stored in the storage medium 104.

In still other implementations, the processing unit 102 may determine the particular sign language of a sign language message by comparing a first set of the detected movements to data regarding multiple different sign languages stored in the movement database 105. Based on the comparison of the first set of movements, the processing unit may identify a first sign language message component of the sign language message. The processing unit may then compare subsequent sets of the detected movements to just data regarding the determined particular sign language to identify additional sign language message components. However, if the processing unit then determines based on comparison to the data regarding the determined particular sign language that a subsequent set of the detected movements does not correspond to the particular sign language, the processing unit may compare the subsequent set of the detected movements to data regarding multiple different sign languages stored in the movement database.

For example, the movement database 105 may include data regarding movements of American Sign Language, Chinese Sign Language, and Ukrainian Sign Language. The processing unit 102 may compare a first set of the detected movements to data regarding American Sign Language, Chinese Sign Language, and Ukrainian Sign Language and identify that the sign language message is in Chinese Sign Language. The processing unit may then compare subsequent portions of the detected movements to just data regarding Chinese Sign Language. However, if the processing unit then determines based on comparison to the data regarding Chinese sign language that a subsequent set of the detected movements does not correspond to Chinese sign language, the processing unit may compare the subsequent set of the detected movements to data regarding American Sign Language, Chinese Sign Language, and Ukrainian Sign Language.

Figure 3A:
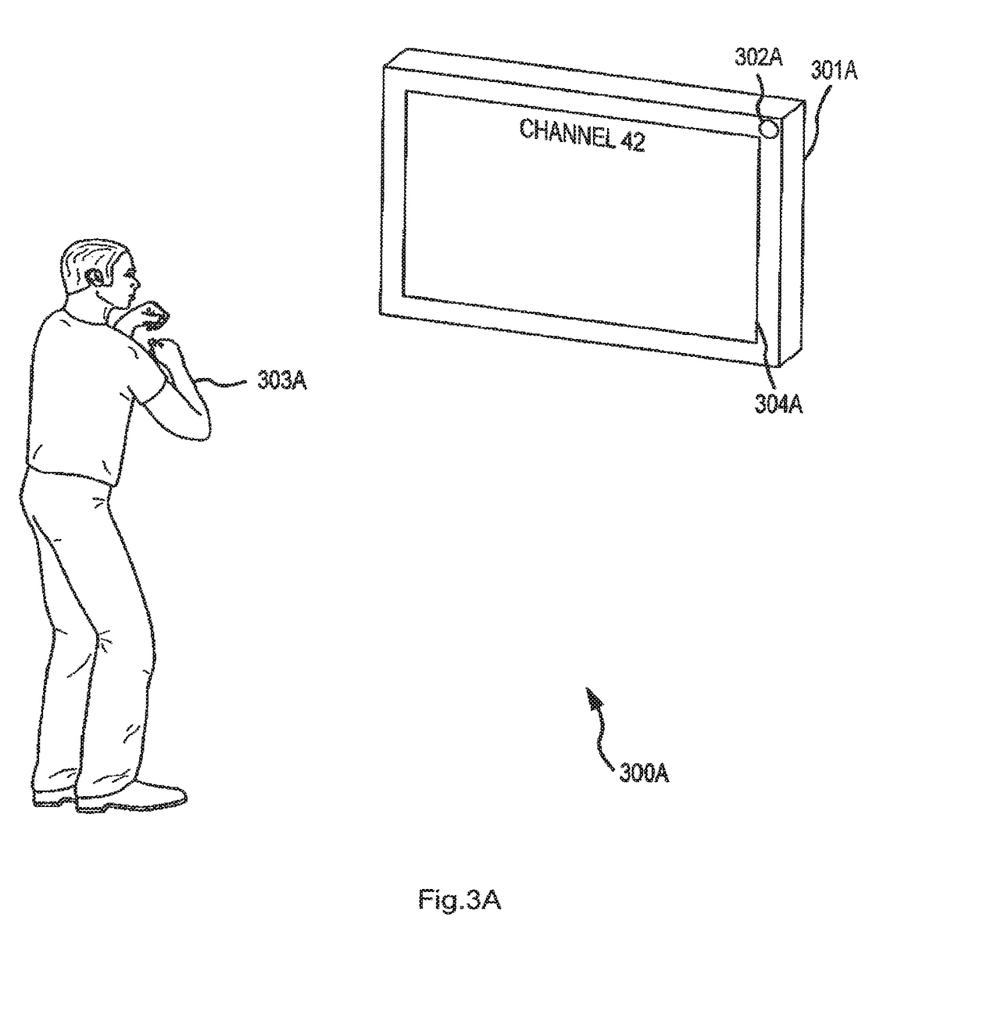
FIGS. 3A-3E are diagrams illustrating a user utilizing a system for controlling an electronic device. The system may be the system of FIG. 1.

FIGS. 3A-3E are illustrate a user 303A-303E utilizing a system 300A-300E for controlling an electronic device 301A-303E. The system may be the system of FIG. 1. FIG. 3A depicts a user 303A watching a display screen 304A of a television 301A. As illustrated, the television is displaying programming corresponding to a channel forty-two on the display screen. The television includes a video camera 302A that detects movements of the user.

Figure 3B:
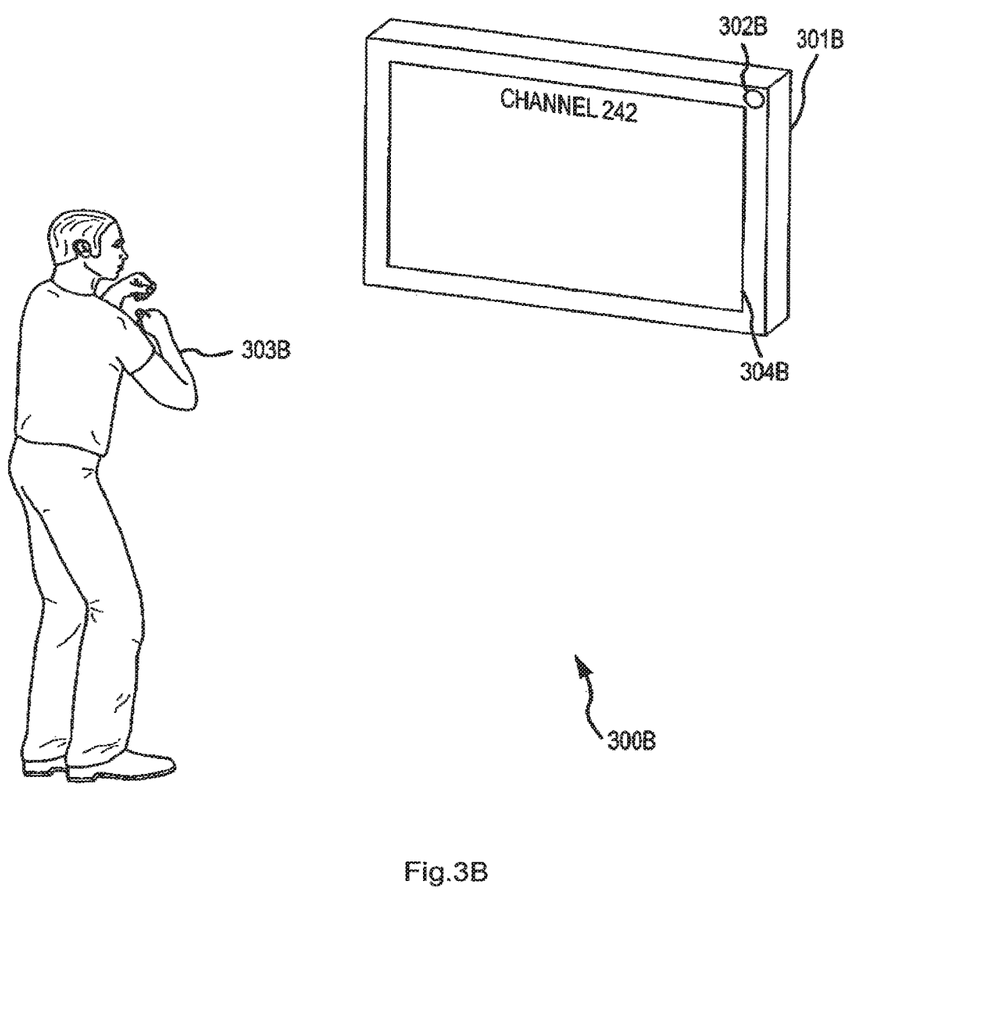

FIG. 3B depicts changes to FIG. 3A after the television 301A detects that the user 303A performed sign language with a message "switch to channel two hundred and forty two" where the television is not configured to output control functions identified from sign language signals. As illustrated, the television 301B displays programming corresponding to a channel two forty-two on the display screen 304B.

Figure 3C:
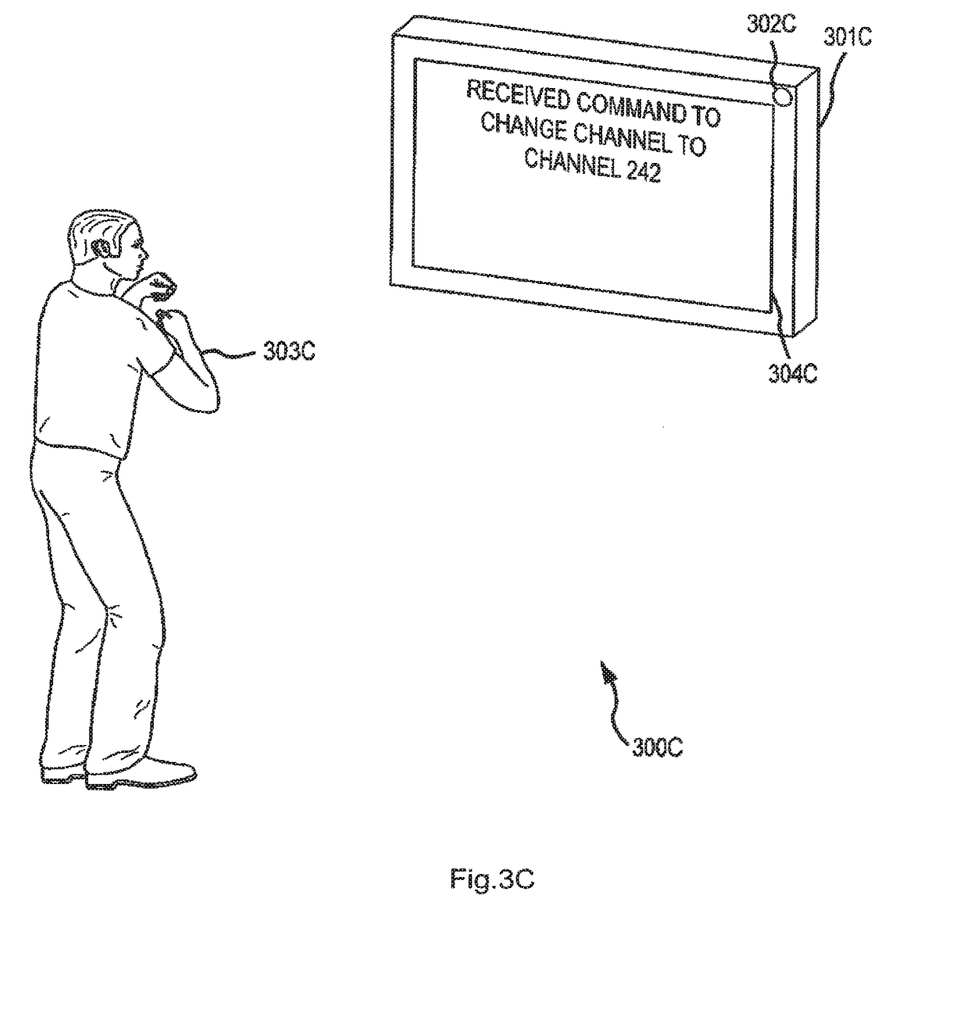

FIG. 3C depicts changes to FIG. 3A after the television 301A detects that the user 303A performed sign language with a message "switch to channel two hundred and forty two" where the television is configured to output control functions identified from sign language signals. As illustrated, the television 301C displays an output message on display screen 304C indicating that a command to switch the channel to channel two hundred forty-two has been received. Then, the television will switch the channel to display programming corresponding to a channel two forty-two on the display screen, as illustrated in FIG. 3B.

Figure 3D:
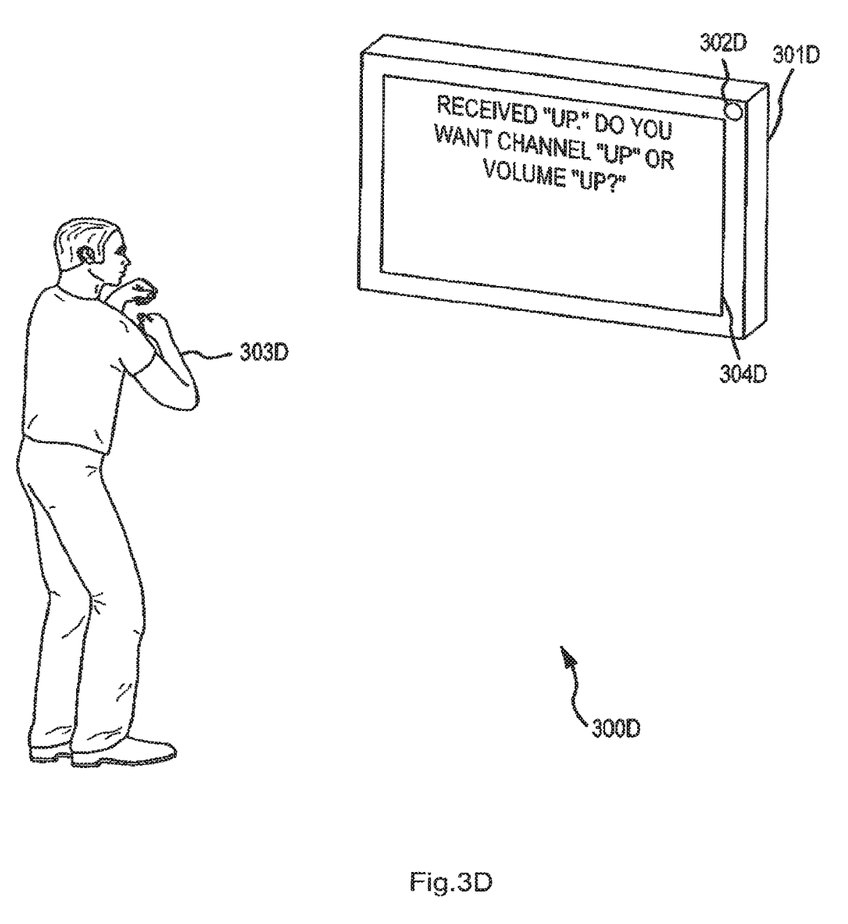
Figure 3E:
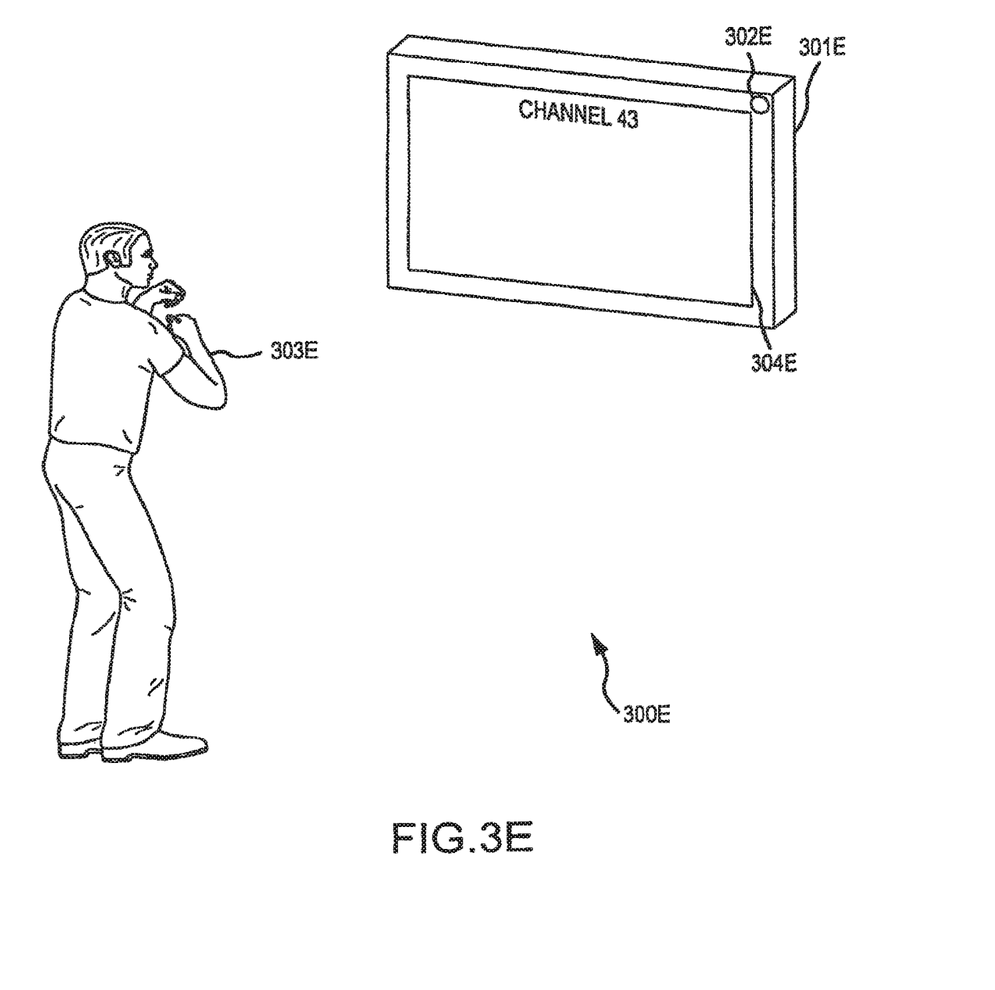

FIG. 3D depicts changes to FIG. 3A after the television 301A detects that the user 303A performed sign language with a message "up." As illustrated the television 301D is unable to unambiguously determine whether the user desires a channel up function or a volume up function and displays an output message on the display screen 304D that prompts the user 303D for additional information. FIG. 3E depicts changes to FIG. 3D after the television 301D detects that the user 303D performed sign language with a message "channel" in order to provide the additional information requested. As illustrated, the television 301E displays programming corresponding to a channel forty-three on the display screen 304E.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for controlling an electronic device using sign language, the method comprising:
    detecting, using a movement sensor, first user movements associated with a user;
    analyzing the first user movements to determine a first sign language message that corresponds to the first user movements;
    identifying a conflict between a first control function of an electronic device and a second control function of the electronic device, wherein the first and second control functions are associated with the first sign language message;
    transmitting a notification to the user via a display device associated with the electronic device, wherein the notification includes a request for the user to repeat the plurality of user movements due to the conflict;
    detecting second user movements associated with the user;
    analyzing the second user movements to determine a second sign language message that corresponds to the second user movements;
    identifying a control function of the electronic device associated with the second sign language message;
    resolving, using the second sign language message, the conflict to determine that the first control function is associated with the first sign language message; and
    executing the first control function on the electronic device.

2. The method of claim 1, further comprising:
    identifying at least one sign language message component by comparing the first user movements to a database of movements associated with movements of one or more sign languages.

3. The method of claim 2, wherein identifying the at least one sign language message component includes comparing the first user movements to movements of a particular sign language stored in the database based on a setting specified by a user.

4. The method of claim 2, wherein identifying the at least one sign language message component further comprises:
    determining a particular sign language of the first sign language message by comparing a first subset of user movements of the first user movements to movements of a plurality of sign languages stored in the database to identify a first sign language message component; and
    comparing at least a second subset of user movements of the first user movements to a subset of the database to identify at least a second sign language message component wherein the subset comprises movements of the particular sign language.

5. The method of claim 4, further comprising:
    determining that at least one additional set of user movements of the first user movements does not correspond to the particular sign language; and
    identifying an additional sign language message component by comparing the additional set of user movements of the first user movements to movements of the plurality of sign languages stored in the database.

6. The method of claim 1, further comprising:
    transmitting a query to the user, wherein the query includes a request for the user to choose an intended option of a set control function options, wherein the set of predetermined options include the first control function and the second control function; and receiving a response to the query from the user, wherein the response includes an indication that an option of the set of control function options is the intended option of the user.

7. The method of claim 6, further comprising:
comparing the response to the query received from the user to the first control function and the second control function, wherein the comparison is used to determine if the conflict was resolved correctly.

8. The method of claim 6, wherein resolving the conflict includes using the response to the query.

9. The method of claim 1, further comprising:
detecting one or more pantomime user movements;
receiving one or more inputs from the user, wherein the one or more inputs are each associated with one or more of the detected one or more pantomime user movements; and
storing the pantomime user movements and their associated user inputs.

10. The method of claim 9, wherein the first user movements include pantomime user movements, and wherein the first sign language message is determined using the stored pantomime user movements and their associated user inputs.

11. A system for controlling an electronic device, comprising:
an electronic device;
a movement sensor that detects a plurality of user movements associated with a user;
a processing unit;
a non-transitory computer readable storage medium communicatively coupled to the one or more processors, wherein the non-transitory computer readable storage medium stores a database of movements associated with movements of one or more sign languages, and wherein the non-transitory computer readable storage medium includes instructions that, when executed by the one or more processors, cause the one or more processors to perform operations including:
detecting, using a movement sensor, first user movements associated with a user;
analyzing the first user movements to determine a first sign language message that corresponds to the first user movements;
identifying a conflict between a first control function of an electronic device and a second control function of the electronic device, wherein the first and second control functions are associated with the first sign language message;
transmitting a notification to the user via a display device associated with the electronic device, wherein the notification includes a request for the user to repeat the plurality of user movements due to the conflict;
detecting second user movements associated with the user;
analyzing the second user movements to determine a second sign language message that corresponds to the second user movements;
identifying a control function of the electronic device associated with the second sign language message;
resolving, using the second sign language message, the conflict to determine that the first control function is associated with the first sign language message; and
executing the first control function on the electronic device.

12. The system of claim 11, wherein the operations further include:
identifying at least one sign language message component by comparing the first user movements to a database of movements associated with movements of one or more sign languages.

13. The system of claim 12, wherein identifying the at least one sign language message component includes comparing the first user movements to movements of a particular sign language stored in the database based on a setting specified by a user.

14. The system of claim 12, wherein identifying the at least one sign language message component further comprises:
determining a particular sign language of the first sign language message by comparing a first subset of user movements of the first user movements to movements of a plurality of sign languages stored in the database to identify a first sign language message component;
comparing at least a second subset of user movements of the first user movements to a subset of the database to identify at least a second sign language message component wherein the subset comprises movements of the particular sign language;
determining that at least one additional set of user movements of the first user movements does not correspond to the particular sign language; and
identifying an additional sign language message component by comparing the additional set of user movements of the first user movements to movements of the plurality of sign languages stored in the database.

15. The system of claim 11, wherein the operations further include:
transmitting a query to the user, wherein the query includes a request for the user to choose an intended option of a set control function options, wherein the set of predetermined options include the first control function and the second control function; and
receiving a response to the query from the user, wherein the response includes an indication that an option of the set of control function options is the intended option of the user.

16. The system of claim 15, wherein the operations further include:
comparing the response to the query received from the user to the first control function and the second control function, wherein the comparison is used to determine if the conflict was resolved correctly.

17. The system of claim 15, wherein resolving the conflict includes using the response to the query.

18. The system of claim 11, wherein the operations further include:
detecting one or more pantomime user movements;
receiving one or more inputs from the user, wherein the one or more inputs are each associated with one or more of the detected one or more pantomime user movements; and
storing the pantomime user movements and their associated user inputs.

19. The system of claim 18, wherein the first user movements include pantomime user movements, and wherein the first sign language message is determined using the stored pantomime user movements and their associated user inputs.

20. A television receiver, comprising:
one or more processors;
a wireless transceiver communicatively coupled to the one or more processors;
a non-transitory computer readable storage medium communicatively coupled to the one or more processors, wherein the non-transitory computer readable storage medium includes instructions that, when executed by the one or more processors, cause the one or more processors to perform operations including:

detecting, using a movement sensor, first user movements associated with a user;

analyzing the first user movements to determine a first sign language message that corresponds to the first user movements;

identifying a conflict between a first control function of an electronic device and a second control function of the electronic device, wherein the first and second control functions are associated with the first sign language message;

transmitting a notification to the user via a display device associated with the electronic device, wherein the notification includes a request for the user to repeat the plurality of user movements due to the conflict;

detecting second user movements associated with the user;

analyzing the second user movements to determine a second sign language message that corresponds to the second user movements;

identifying a control function of the electronic device associated with the second sign language message;

resolving, using the second sign language message, the conflict to determine that the first control function is associated with the first sign language message; and executing the first control function on the electronic device.

* * * * *